(12) United States Patent
Nishtala et al.

(10) Patent No.: US 8,732,506 B2
(45) Date of Patent: May 20, 2014

(54) METHOD AND APPARATUS FOR PROVIDING POWER TO A SERVER PLATFORMS BY USING A CAPACITOR TO PROVIDE POWER DURING A SECOND POWER SUPPLY TRANSITIONING ON

(75) Inventors: Satyanarayana Nishtala, Cupertino, CA (US); Mark Ramon Imbertson, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 259 days.

(21) Appl. No.: 13/116,345

(22) Filed: May 26, 2011

(65) Prior Publication Data

US 2012/0303993 A1 Nov. 29, 2012

(51) Int. Cl.
*G06F 1/30* (2006.01)
*G06F 1/00* (2006.01)

(52) U.S. Cl.
USPC .......................................... 713/340; 713/324

(58) Field of Classification Search
USPC .......................................... 713/300, 324, 340
See application file for complete search history.

(56) References Cited

U.S. PATENT DOCUMENTS

| | | | |
|---|---|---|---|
| 5,692,197 A | 11/1997 | Narad et al. | |
| 7,750,501 B2 * | 7/2010 | Huang | ............................. 307/45 |
| 7,818,594 B2 | 10/2010 | Gorbatov et al. | |
| 7,895,455 B2 | 2/2011 | Green et al. | |
| 8,051,316 B2 * | 11/2011 | Roberts et al. | ................. 713/330 |
| 8,261,102 B2 * | 9/2012 | Cheng et al. | .................... 713/300 |
| 2003/0222618 A1 * | 12/2003 | Kanouda et al. | ............... 320/116 |
| 2005/0055587 A1 * | 3/2005 | Lee | ................................ 713/300 |
| 2005/0088138 A1 * | 4/2005 | Sasaki | ........................... 320/101 |
| 2006/0168464 A1 * | 7/2006 | Yuasa | ............................ 713/340 |
| 2007/0097569 A1 * | 5/2007 | Huang | ............................. 361/56 |
| 2010/0052426 A1 * | 3/2010 | Carter et al. | ..................... 307/64 |
| 2010/0235662 A1 | 9/2010 | Nishtala | |
| 2010/0332857 A1 * | 12/2010 | Vogman | ........................ 713/300 |
| 2011/0252247 A1 * | 10/2011 | Yokoyama | ..................... 713/300 |
| 2011/0266867 A1 | 11/2011 | Schindler et al. | |

* cited by examiner

*Primary Examiner* — Thomas Lee
*Assistant Examiner* — Phil Nguyen
(74) *Attorney, Agent, or Firm* — P. Su

(57) ABSTRACT

In one embodiment, a method includes determining if a power load requirement associated with a server arrangement is below a threshold. The server arrangement includes at least a first power supply and a second power supply, as well as a capacitor arrangement. The method also includes providing power to the server arrangement using the first power supply and not the second power supply when it is determined that the power load requirement is below the threshold, and providing the power to the server arrangement using the first power supply and the second power supply when it is determined that the power load requirement is not below the threshold.

20 Claims, 10 Drawing Sheets

METHOD AND APPARATUS FOR PROVIDING POWER TO A SERVER PLATFORMS BY USING A CAPACITOR TO PROVIDE POWER DURING A SECOND POWER SUPPLY TRANSITIONING ON

The disclosure relates generally to the power efficiency of server platforms and, more specifically, to improving power efficiency when power supplies associated with server platforms are operating at relatively low loads.

BACKGROUND

Server architectures are typically designed to manage power drawn from power supplies based on application loads. Generally, as an application load is increased, the power drawn by a server architecture is increased. Conversely, as the application load is reduced, the power drawn by the server architecture is reduced. When designing a server architecture, servers and their associated power supplies are designed to accommodate peak load estimates. Power supplies used to provide power to servers within a server architecture are often chosen such that a worst case load may be accommodated. For example, blade system power supplies are often designed to support a peak power draw.

Although server designs are sized based on peak load estimates, many server designs often do not operate at or near their peak load estimates. That is, many servers operate at relatively low load, e.g., near idle, conditions for a significant portion of time and, thus, power supplies are not often fully loaded. As the efficiency associated with power supplies decreases as the power drawn from the power supplies decreases, when power supplies are operating at relatively low loads for a significant portion of time, the power supplies are operating with relatively low power efficiency for a significant portion of time.

Multiple power supplies are often used to deliver power within a server architecture, and to share the load substantially equally. While substantially equal load sharing amongst multiple power supplies may enhance the reliability and availability of a server design, efficiency with which power is used may be reduced, as the efficiency associated with a power supply generally decreases as the load or power drawn from the power supply is reduced. Thus, when multiple power supplies are equally sharing a load and are each operating at relatively low loads, the delivered efficiency is compromised.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
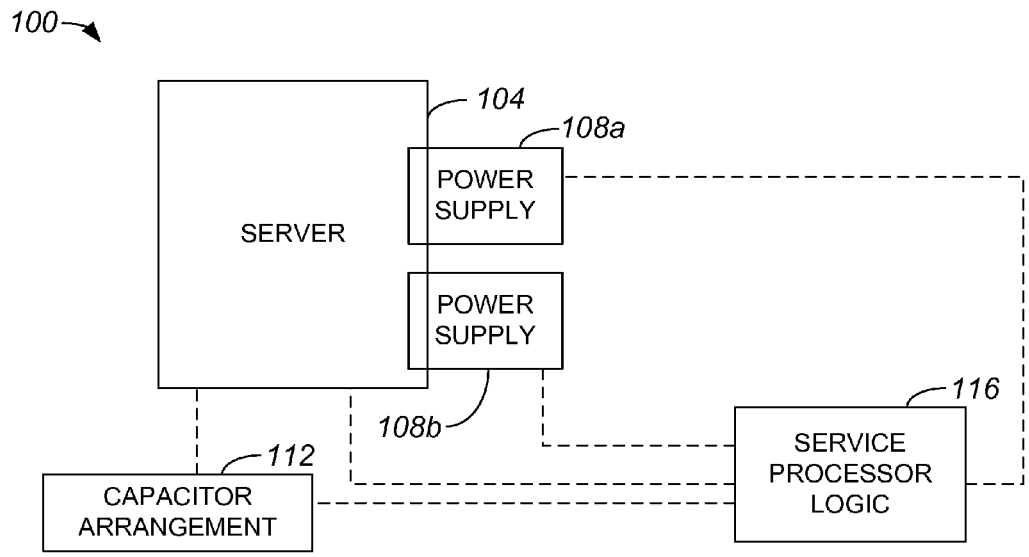
FIG. 1A is a diagrammatic representation of a server design or deployment that includes a capacitor arrangement in accordance with an embodiment.

According to one aspect, a method includes determining if a power load requirement associated with a server arrangement is below a threshold, e.g., if power drawn by the server arrangement is below a particular level. The server arrangement includes at least a first power supply and a second power supply, as well as a capacitor arrangement. The method also includes providing power to the server arrangement using the first power supply and not the second power supply when it is determined that the power load requirement is below the threshold, and providing the power to the server arrangement using the first power supply and the second power supply when it is determined that the power load requirement is not below the threshold.

DESCRIPTION

Server designs, e.g., deployments, or platforms are generally sized based on peak load estimates. Because many servers operate at a low load or a near idle condition for a relatively large portion of time, power supplies, e.g., AC-DC power supplies, used to power the servers are often loaded at the lower end of their power ratings for extended periods of time. As power supplies exhibit lower power efficiency at lower loads, the delivered efficiency of the power supplies may be relatively low for extended periods of time.

Many server designs include multiple power supplies that share a power load substantially equally. Thus, when a server operates at a low load or a near idle condition, multiple power supplies may operate at a relatively low power efficiency. That is, the power drawn from each power supply is further reduced and, as such, the efficiency at which the multiple power supplies operate is also further reduced. When multiple power supplies are substantially all operating at a relatively low power efficiency, the overall power efficiency of an overall server system may be compromised.

In one embodiment, one power supply is enabled to operate to provide power to a server arrangement at a relatively low load and/or a near idle condition, while a "redundant" power supply is disabled. By powering up additional or redundant power supplies associated with the server arrangement as load conditions increase, while leaving such additional or redundant power supplies disabled at lower load conditions, the power efficiency at a relatively low load and/or near idle condition is increased. That is, on a server system that includes more than one installed power supply, by enabling one power supply to provide power at relatively low loads and/or near idle conditions, and then allowing power to be supplied by more than one power supply at higher loads, the efficiency at which power may be provided is enhanced. Rather than having a plurality of power supplies operating at relatively low loads and, therefore, operating inefficiently, one power supply out of the plurality of power supplies may operate when power requirements are relatively low, thereby increasing the overall delivery efficiency associated with a server deployment.

Essentially enabling one installed power supply or a small set of installed power supplies when load conditions are relatively low or near idle, while retaining redundant, but substantially disabled, installed power supplies within a server deployment, and utilizing such redundant installed power supplies when load conditions are not relatively low and/or near idle, allows the reliability and availability of the server deployment to be retained while improving the overall power efficiency associated with the server deployment. Although substantially disabling redundant power supplies at any load impacts the ability of a server system to survive a power supply or input power failure. By providing an alternate power source in the server system that may deliver power to a server in the event of a power failure, the server system may survive a power supply or input power failure even while redundant power supplies are disabled. In one embodiment, an ultra capacitor or a super capacitor may be used to deliver power to a server during a "switch over," e.g., a transition period, to utilizing the redundant power supply. An ultra capacitor or super capacitor may provide power to a server while a redundant power supply is effectively coming on line, and is effectively a reservoir of power that may effectively be tapped during a process of enabling an additional or redundant power supply.

Referring initially to FIG. 1A, an example of a server system that includes a capacitor arrangement will be described in accordance with an embodiment. A server system 100 includes at least one server 104. Server 104 has at least two associated power supplies 108a, 108b and an associated capacitor arrangement 112. Power supplies 108a, 108b may generally either be incorporated in server 104, or may be external to server 104a but in communication with, or connected to, server 104.

Service processor logic 116 is arranged to control power supplies 108a, 108b and capacitor arrangement 112 substantially without impacting the operation of server 104. Service processor logic 116 may determine when to provide power to server 104 using a single power supply, e.g., power supply 108a, and when to provide power to server 104 using dual power supplies, e.g., power supply 108a and power supply 108b. In addition, service processor logic 116 is arranged to control when capacitor arrangement 112 provides power to server 104a. Capacitor arrangement 112 generally includes at least one capacitor that effectively serves as a reservoir of power. Hence, capacitor arrangement 112 may provide power to server 104 during a transition from using a single power supply to using dual power supplies.

Figure 1B:
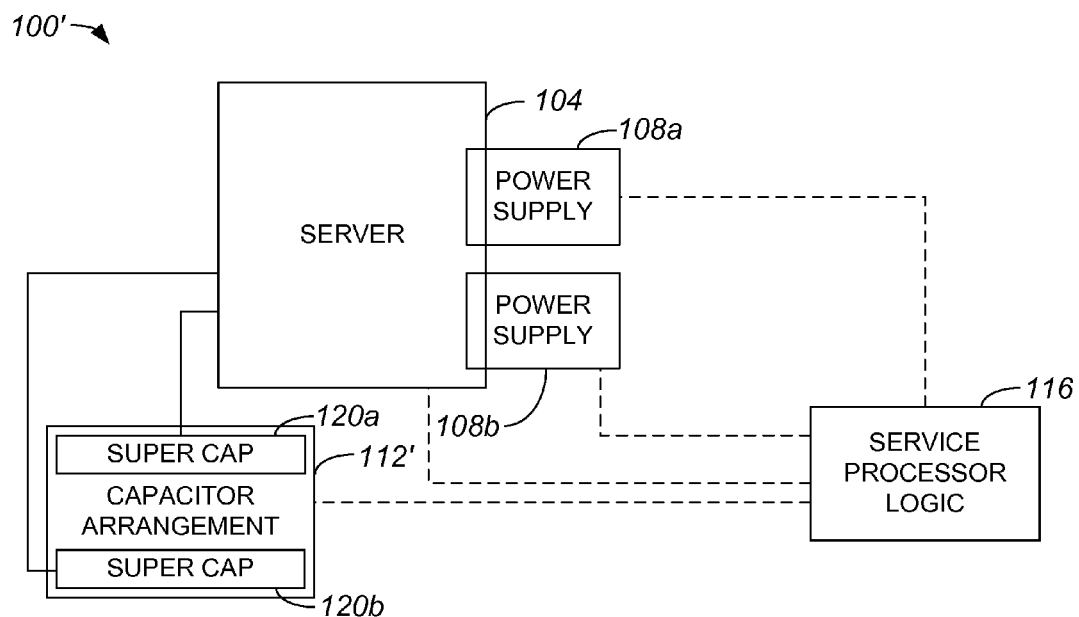
FIG. 1B is a diagrammatic representation of a server design, e.g., server design 100 of FIG. 1A, that includes a capacitor arrangement with a plurality of super capacitors in accordance with an embodiment.

As mentioned above, capacitor arrangement 112 may include a super capacitor. FIG. 1B is a diagrammatic representation of a server system, e.g., server system 100 of FIG. 1A, that includes a capacitor arrangement with a plurality of super capacitors in accordance with an embodiment. A server system 100' includes a capacitor arrangement 112'. Capacitor arrangement 112' includes a plurality of super capacitors 120a, 120b, although capacitor arrangement 112' may include any number of super capacitors that store energy as a static charge. When server 104 is switching over from being powered by a single power supply, e.g., power supply 108a, to being powered by dual power supplies, e.g., power supply 108a and power supply 108b, at least one of super capacitors 120a, 120b may provide power to server 104.

Figure 2A:
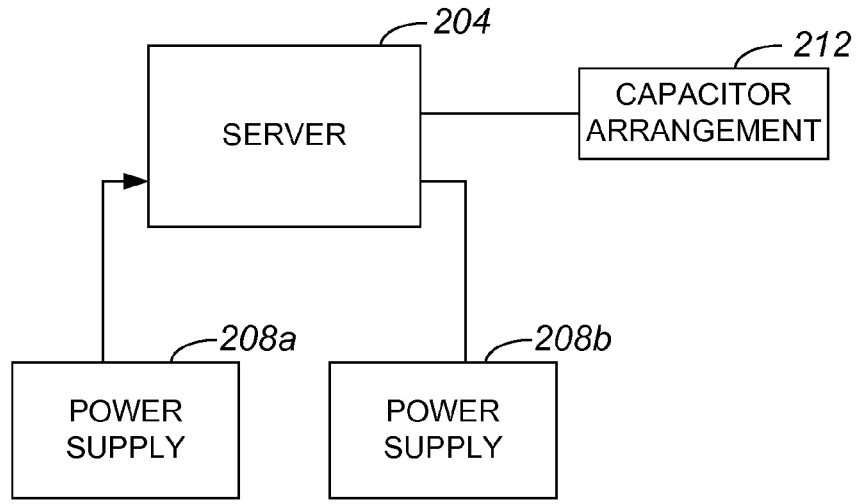
FIG. 2A is a diagrammatic representation of a server at a time t1 at which a power load requirement of the server is suitable for power to be supplied by a single power supply in accordance with an embodiment.

FIG. 2A is a diagrammatic representation of a server at a time t1 at which a power load demand of the server is suitable for power to be supplied by a single power supply in accordance with an embodiment. A server system 200 includes a server 204 that is arranged to potentially be powered by power supplies 208a, 208b, and a capacitor arrangement 212. For ease of illustration, power supplies 208a, 208b are shown as being external to server 204 but substantially connected to server 204. It should be appreciated, however, that power supplies 208a, 208b may instead be integrated substantially into server 204. In one embodiment, power supplies 208a, 208b may be part of a blade system. At a time t1, a power load demand of server 204 is such that from an efficiency standpoint, providing power to server 204 using power supply 208a and not power supply 208b is more efficient. In the described embodiment, at time t1, the power load demand of server 204 is relatively low and is below a power demand threshold associated with server system 200. Thus, power supply 208a provides load to server 204.

Figure 2B:
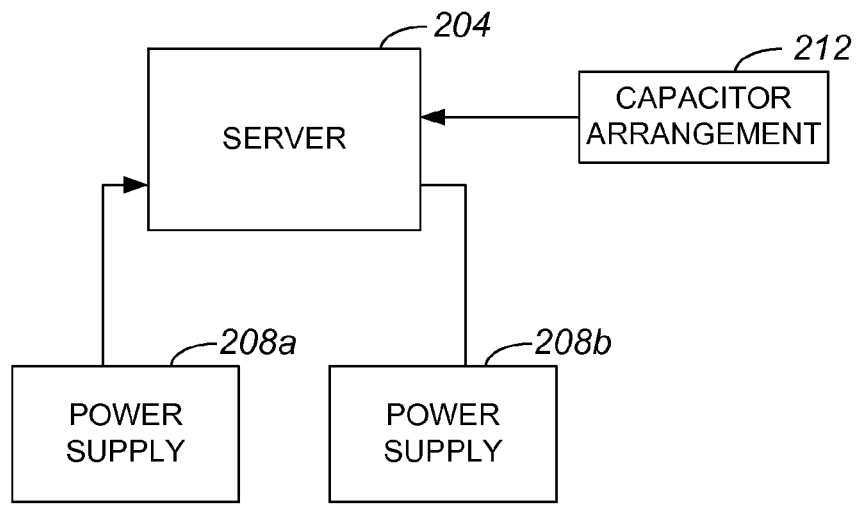
FIG. 2B is a diagrammatic representation of a server, e.g., server 204 of FIG. 2A, at a time t2 at which a power load requirement of the server is determined to be suitable for power to be supplied by dual power supplies in accordance with an embodiment.

At a time t2, as shown in FIG. 2B, the power load demand of the server is determined to be such that from an efficiency standpoint, providing power to server 204 using both power supplies 208a, 208b is more efficient than providing power to serve 204 using only power supply 208a. In other words, at time t2, the power load demand of server 204 is no longer relatively low and is no longer below the power demand threshold. When it is determined that the power load demand of server 204 is no longer below the power demand threshold, power supply 208b begins a powering on process. During such a powering on process, capacitor arrangement 212 provides power to server 204. Thus, at time t2, power is provided to server 204 by capacitor arrangement 212.

Figure 2C:
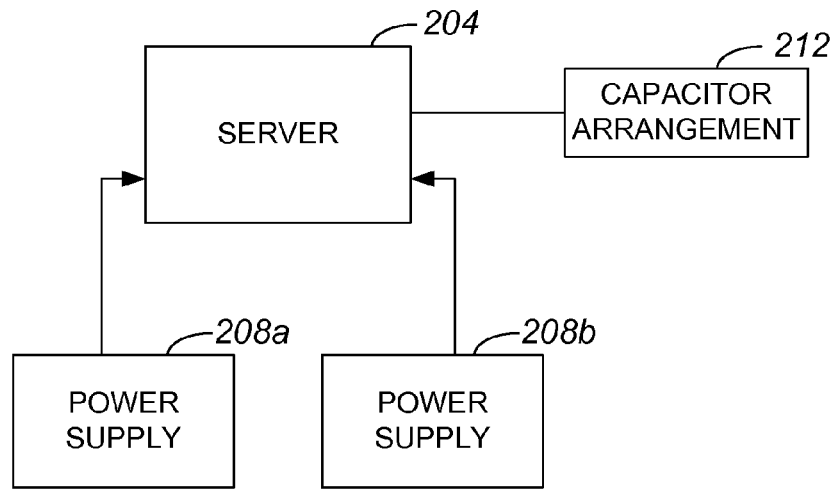
FIG. 2C is a diagrammatic representation of a server, e.g., server 204 of FIG. 2A, at a time t3 at which a power load requirement of the server is met by dual power supplies in accordance with an embodiment.

FIG. 2C is a diagrammatic representation of server 204 at a time t3 at which power supply 208b has powered on. When power supply 208b is powered on, both power supplies 208a, 208b provide power to server 204, and capacitor arrangement 212 no longer provides power to server 204.

Figure 2D:
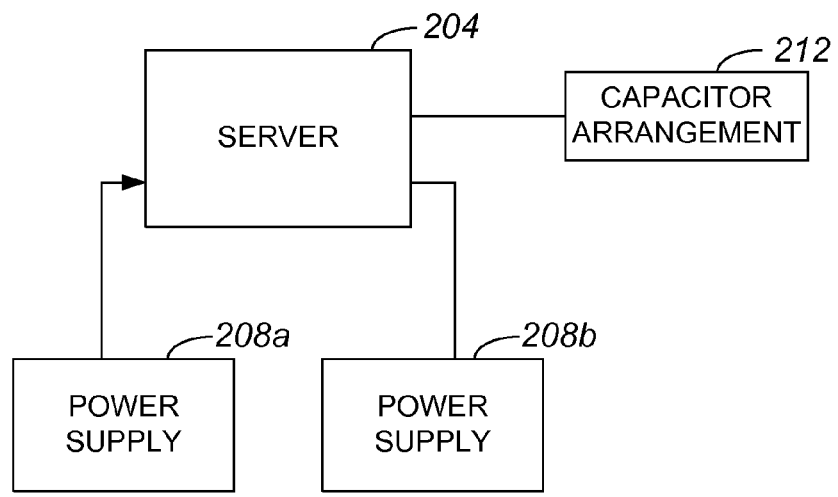
FIG. 2D is a diagrammatic representation of a server, e.g., server 204 of FIG. 2A, at a time t4 at which a power load requirement of the server is once again suitable for power to be supplied by a single power supply in accordance with an embodiment.

In the described embodiment, the power load demand of server 204 drops below the power demand threshold at a time t4. Thus, because the power load demand is relatively low at time t4, the efficiency with which load is provided to server 204 is increased if load is substantially provided only by power supply 208a and not by power supply 208b. Hence, as shown in FIG. 2D, when power load demand drops below the power demand threshold, power supply 208a provides power to server 204 and power supply 208b is disabled.

Figure 3:
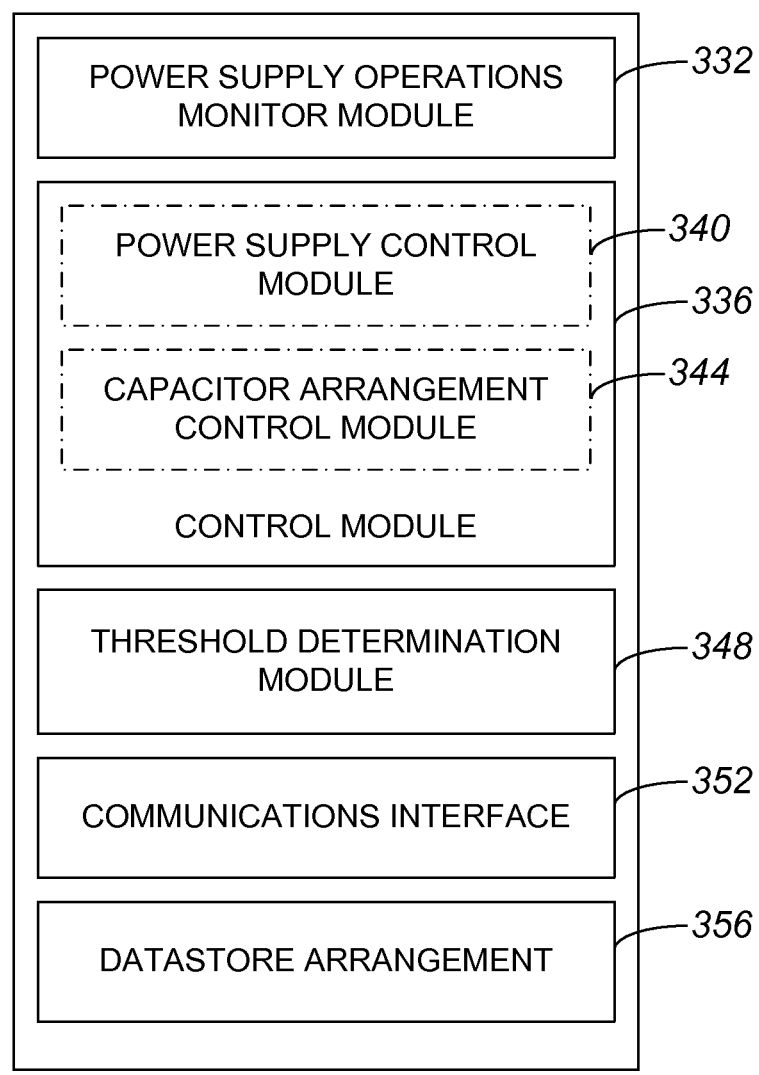
FIG. 3 is a diagrammatic representation of a service processor arrangement, e.g., server processor logic 116 of FIG. 1A, in accordance with an embodiment.

A service processor arrangement generally controls a server or, more specifically, components of a server. With reference to FIG. 3, one embodiment of a service processor arrangement, e.g., server processor logic 116 of FIG. 1A, will be described. A service processor arrangement 116 may include hardware and/or software logic. A power supply operations monitor module 332 is configured to monitor power supplies associated with a server system such that the overall health of the power supplies may be ascertained. For example, power supply operations monitor module 332 may communicate with a power supply through a communications interface 352 to determine a present load on the power supply, to determine a capacity associated with the power supply, to determine a delivery efficiency of the power supply, and/or to determine whether the power supply is operating as expected. Information obtained by power supply operations monitor module 332 may be stored in a datastore arrangement 356.

A control module 336 includes a power supply control module 340 and a capacitor arrangement control module 344. Power supply control module 340 is configured to cooperate with communications interface 352 to cause a power supply to power on and to power off. That is, power supply control module 340 is arranged to cause a power supply that is off line to come on line, and vice versa. Capacitor arrangement control module 344 is arranged to cooperate with communications interface 352 to cause a capacitor arrangement to provide power, e.g., to a server, when needed. For example, capacitor arrangement control module 344 may cause a capacitor arrangement to provide power while a redundant power supply is powering on.

A threshold determination module 348 is configured, in one embodiment, to identify a power demand threshold associated with a server system. Threshold determination module 348 may implement an algorithm to determine a power demand threshold based on, but not limited to be based on, efficiency-load relationships of single power supplies and dual power supplies. By way of example, a power demand threshold may be determined substantially by optimizing an overall delivery efficiency of load within a server system.

Figure 4:
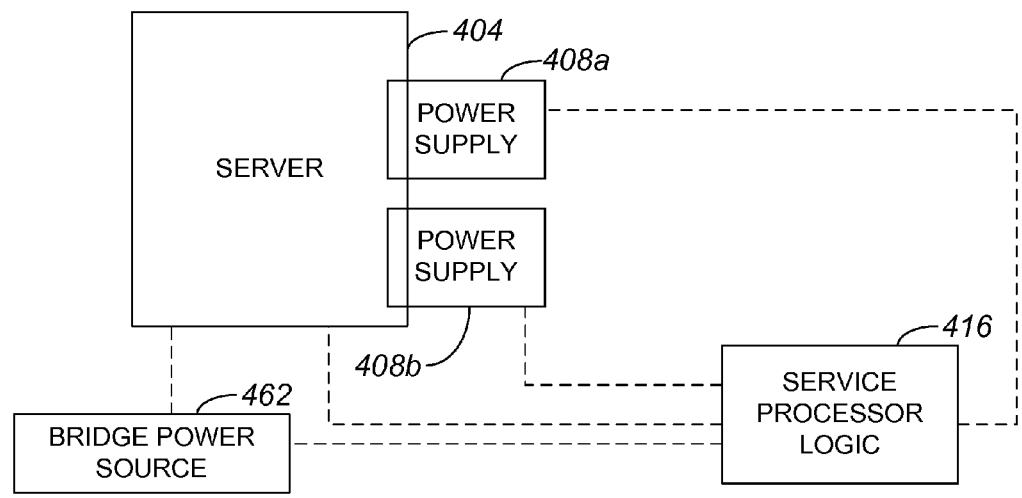
FIG. 4 is a diagrammatic representation of a server design that includes a transitional or bridge power source in accordance with an embodiment.

While a capacitor arrangement that utilizes an ultra capacitor or a super capacitor is suitable for use in providing power to a server during a switch over, other bridge power sources may instead be used to provide power to the server during a switch over. In other words, power provided during a transition period while an additional power source is being powered on is not limited to being provided by a capacitor arrangement. FIG. 4 is a diagrammatic representation of a server system that includes a transitional or bridge power source in accordance with an embodiment. A server deployment 460 includes at least one server 404. Server 404 has at least two associated power supplies 408a, 408b and an associated bridge power source 462, e.g., a reservoir of power.

Service processor logic 416 is arranged to control power supplies 408a, 408b and bridge power source 462 substantially without impacting the operation of server 404. Service processor logic 416 may determine when to provide power to server 404 using a single power supply, e.g., power supply 408a, and when to provide power to server 404 using dual power supplies, e.g., power supply 408a and power supply 408b. Further, service processor logic 416 is arranged to control when bridge power source 462 provides power to server 404. In the described embodiment, bridge power source 462 may be any suitable power source that is capable of providing a current boost in response to an increased power demand from server 404. Suitable power sources include, but are not limited to including, a battery and/or a combination of a super capacitor and a battery.

Figure 5A:
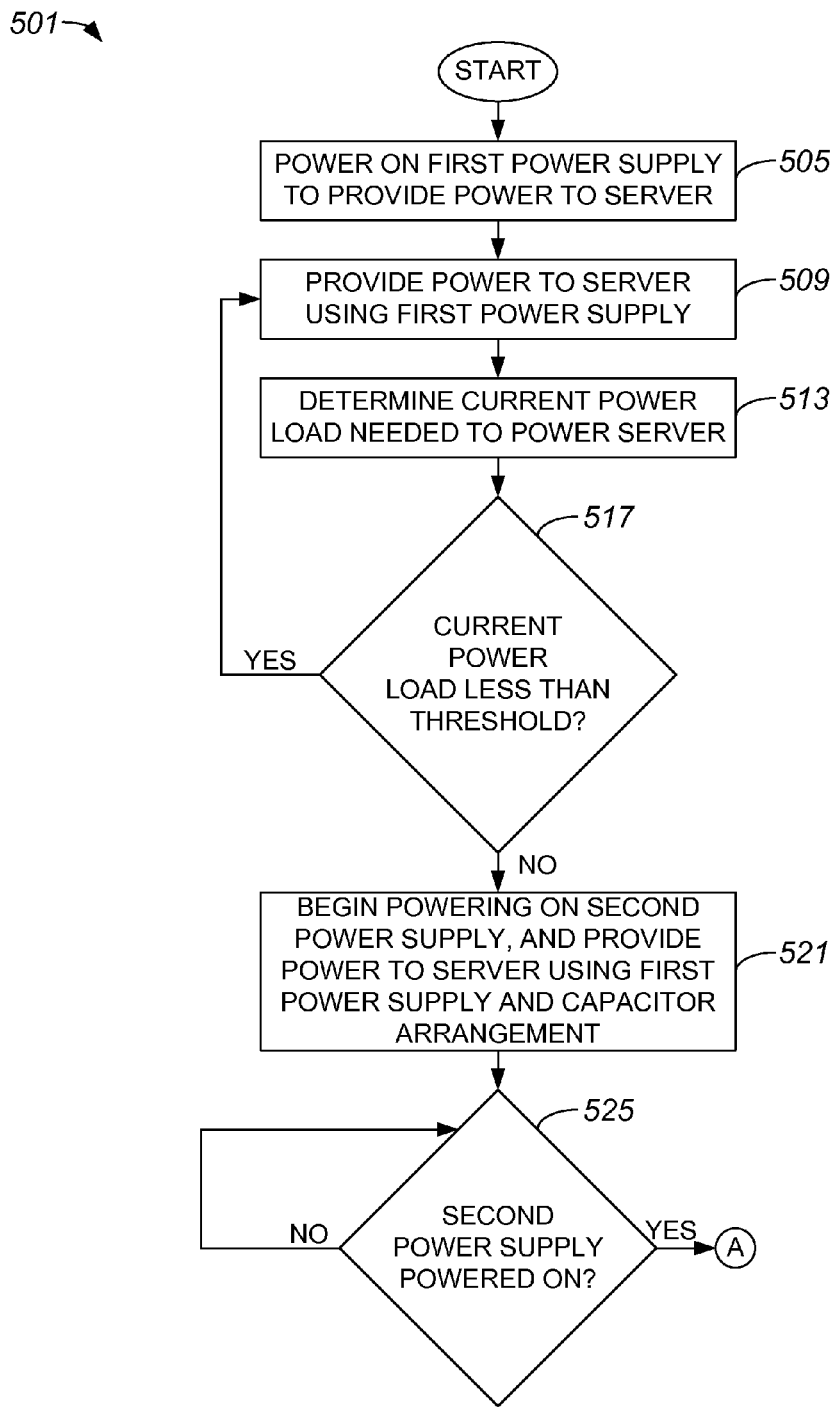
FIGS. 5A and 5B are a process flow diagram which illustrates one method of operating a server arrangement or design that includes a plurality of power supplies and a capacitor arrangement in accordance with an embodiment.
Figure 5B:
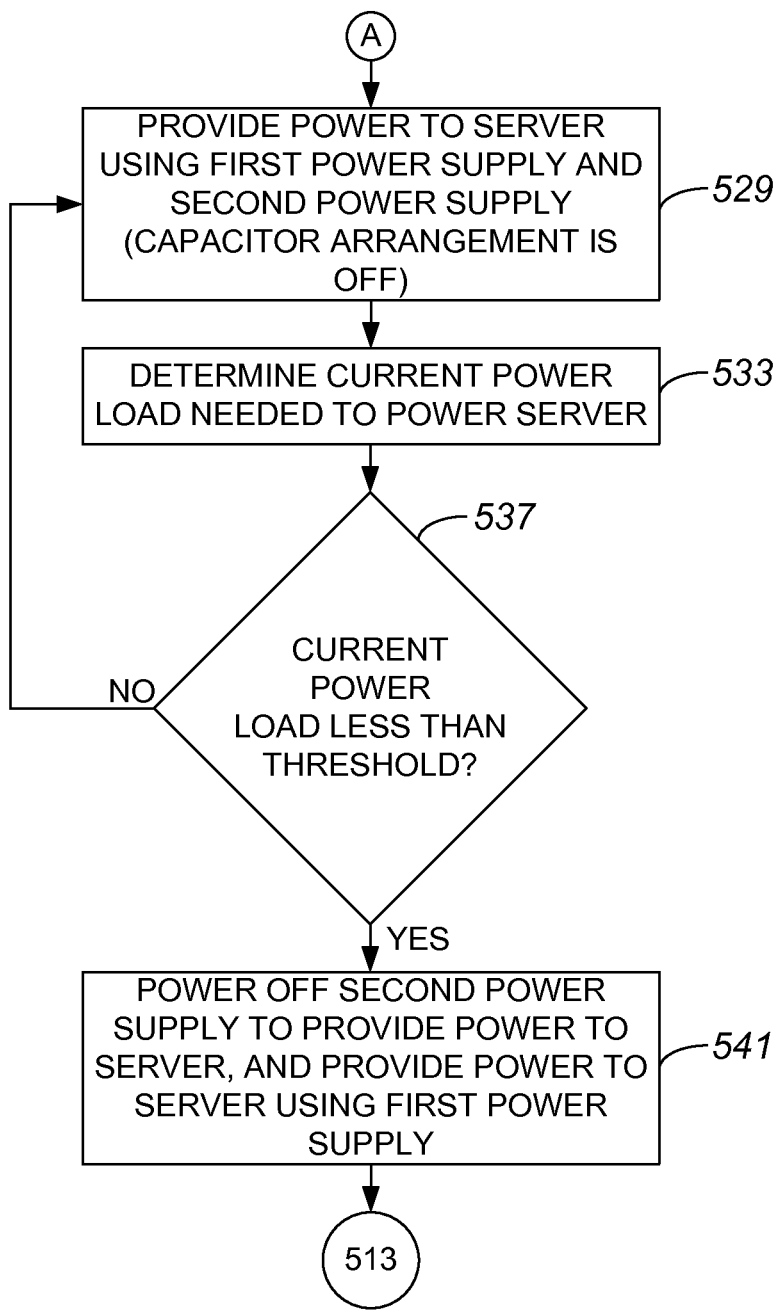

FIGS. 5A and 5B are a process flow diagram which illustrates one method of operating a server system that includes a plurality of power supplies and a capacitor arrangement in accordance with an embodiment. A method of operating a server system begins at step 505 in which a first power supply is powered on to provide power to a server included in the server system. The first power supply may be integrated into the server or external to the server but arranged to provide power to the server. Once the first power supply is powered on, the first power supply provides power to the server in step 509.

In step 513, a current power load needed to adequately power the server is determined. That is, the existing or up-to-date power demands of the server are identified. The current power load needed to adequately power the server may be determined by, but is not limited to being determined by, monitoring the server. After the current power load needed to adequately power the server is determined, a determination is made in step 517 as to whether the current power load is less than a threshold. The threshold may be, in one embodiment, an amount of power load demanded by the server that effectively triggers power being provided by at least a second power supply in addition to the first power supply.

If the determination in step 517 is that the current power load is less than the threshold, the indication is that the load demanded by the server is relatively low. Thus, the first power supply is efficiently providing power to the server. As such, process flow returns to step 509 in which the first power supply continues to provide power to the server.

Alternatively, if it is determined in step 517 that the current power load is not less than the threshold, the implication is that the efficiency with which power is supplied to the server would be increased if an additional power supply were to be brought on line to supply power to the server. Accordingly, in step 521, a second power supply is enabled and, thus, begins to power on to share the power load with the first power supply. While the second power supply begins to power on, power continues to be provided to the server by the first power supply, and a capacitor arrangement provides additional power to the server while the second power supply powers on. In one embodiment, the capacitor arrangement is an ultra capacitor or a super capacitor that powers the server while the second power supply powers on, e.g., during a transition period or switch over. The amount of time the capacitor arrangement provides power may vary widely, and may be, but is not limited to being, on the order of approximately one second.

A determination is made in step 525 as to whether the second power supply is successfully powered on. If it is determined that the second power supply is not yet successfully powered on, then the second power supply continues to power on, and step 525 is repeated. If it is determined that the second power supply has successfully powered on, then process flow proceeds to step 529 in which power is provided to the server using the first power supply and the second power supply. It should be appreciated that once the second power supply begins to provide power to the server, e.g., when the second power supply is on line, the capacitor arrangement no longer provides power to the server.

From step 529, process flow proceeds to step 533 in which a current power load needed to power the server is determined or reassessed. Then, in step 537, it is determined whether the current power load is less than the threshold. If it is determined that the current power load is less than the threshold, then power continues to be provided to the server using the first power supply and the second power supply in step 529.

Alternatively, if it is determined in step 537 that the current power load is less than the threshold, the indication is typically that providing power to the server using the first power supply, and not using both the first power supply and the second power supply, is more efficient. As such, the second power supply is powered off, e.g., taken off line, in step 541, and power is provided to the server using the first power supply. After the second power supply is powered off, process flow returns to step 513 in which the current power load needed to power the server is determined.

Figure 6:
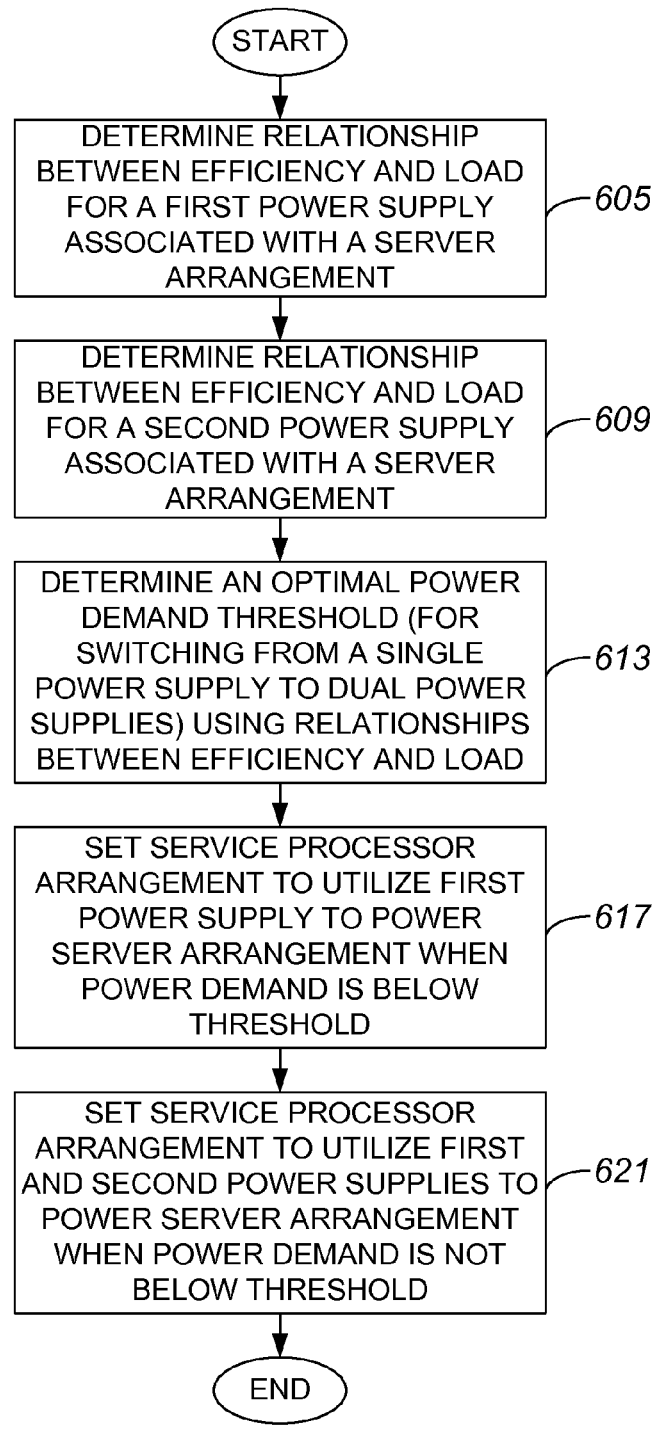
FIG. 6 is a process flow diagram which illustrates one method of specifying a power demand threshold in accordance with an embodiment.

As mentioned above, a power demand threshold at which a server deployment may effectively switch from being powered by a first power supply to being powered by both a first power supply and a second power supply, e.g., effectively switch from being powered by a single power supply to being powered by dual power supplies, may be determined based upon efficiency considerations. In one embodiment, a power demand threshold may be associated with a load at which the efficiency of operating a first power supply is substantially the same as the efficiency of operating both a first power supply and a second power supply. Referring next to FIG. 6, one method of specifying a power demand threshold will be described in accordance with an embodiment. A method of specifying a power demand threshold begins at step 605 in which a relationship between efficiency and load is determined for a first power supply, i.e., a first power supply associated with a server arrangement. In step 609, a relationship between efficiency and load is determined for a second power supply associated with the server arrangement. Relationships between efficiency and load may be determined by calibrating, or otherwise monitoring, the power supplies.

Once relationships between efficiency and load for the power supplies are determined, a substantially optimal power demand threshold is determined in step 613 using the relationships between efficiency and load. In one embodiment, the substantially optimal power demand threshold may be identified as a load at which the efficiency associated with operating the first power supply is approximately equal to the efficiency associated with operating both the first power supply and the second power supply. One method of using relationships between efficiency and load to identify a power demand threshold will be discussed below with respect to FIG. 7.

After a substantially optimal power demand threshold is determined, process flow moves to step 617 in which a service processor arrangement associated with the server arrangement is configured to utilize the first power supply to power the server arrangement when power demand is below the threshold. In step 621, the service processor arrangement is configured to utilize both the first and second power supplies to power the server arrangement when power demand is not below the threshold, e.g., when the power demand is greater than or approximately equal to the threshold. Upon configuring the service processor arrangement, the method of specifying a power demand threshold is completed.

Figure 7:
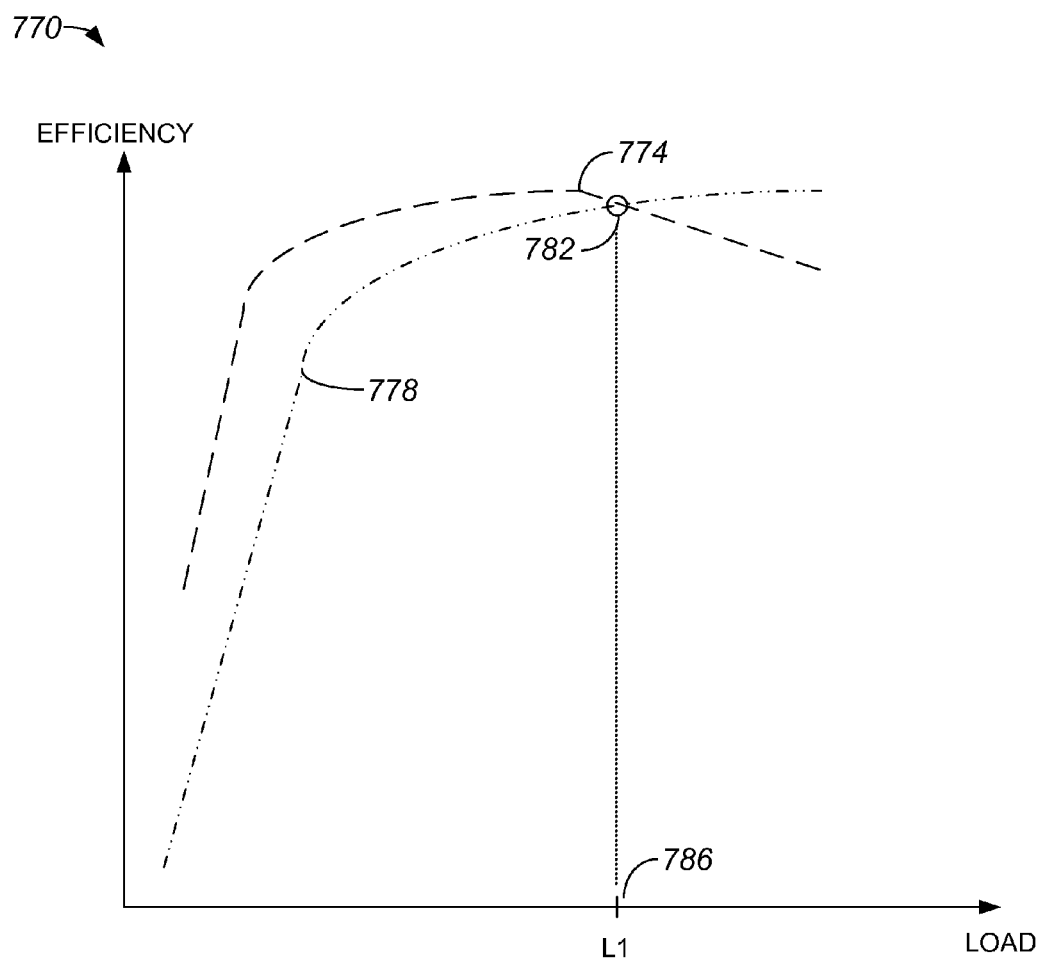
FIG. 7 is a diagrammatic representation of an efficiency curve diagram that is suitable for use in determining a power demand threshold in accordance with an embodiment.

FIG. 7 is a diagrammatic representation of an example of an efficiency curve diagram that is suitable for use in determining a power demand threshold in accordance with an embodiment. An efficiency curve diagram 770 includes a first axis that corresponds to a supplied load and a second axis that corresponds to an efficiency, e.g., an efficiency with which power may be supplied. A first curve 774 represents an efficiency-load relationship associated with a single power supply. A second curve 778 represents an efficiency-load relationship associated with dual power supplies. While the dual power supplies may substantially equally share the load, the dual power supplies may instead share the load such that one power supply takes a larger share of the load than the other. It should be appreciated that the dual power supplies associated with second curve 778 include the power supply associated with first curve 774. As shown, at lower loads, the use of a single power supply to provide power to server is more efficient than the use of dual power supplies to provide power to the server.

A point 782 is an intersection of first curve 774 and second curve 778, and indicates a load L1 786 at which the efficiency associated with the operation of a single power supply is approximately the same as the efficiency associated with the operation of dual power supplies. In the described embodiment, load L1 786 may be identified as a power demand threshold. Thus, for loads less than the load L1 786, a single power supply may be used to supply power to a server. Conversely, for loads that are not less than load L1 786 dual power supplies may be used to supply power to a server.

Although only a few embodiments have been described in this disclosure, it should be understood that the disclosure may be embodied in many other specific forms without departing from the spirit or the scope of the present disclosure. By way of example, each power supply associated with a server design may include a dedicated super capacitor that is arranged to provide power during a switch over that enables the power supply to essentially come on line. In other words, each power supply may have an associated power supply that is configured to power on substantially only that associated power supply. Alternatively, a server design may include at least one super capacitor that is arranged to provide power during a switch over to any power supply associated with the server design.

While the use of a substantially single power supply to provide power to a server has been described as being suitable when a power requirement of the server is below a threshold or particular level, any number of power supplies may provide power to the server when the power requirement of the server is below a threshold. For instance, a plurality of power supplies may provide power to the server when the power requirement of the server is below a threshold, and more than the plurality of power supplies may provide power to the server when the power requirement of the server exceeds a threshold. In general, in a system that includes N+1 power supplies where N is an integer, anywhere between 1 and N of the power supplies may be additional or redundant power supplies which are arranged to be used in the event that the power requirement of a server exceeds a threshold.

Additionally, when a single power supply used to provide power to a server has failed and is no longer able to provide power to a server, a super capacitor may provide power to the server until a redundant power supply is enable to provide power to the server. In other words, a super capacitor may provide a reservoir of power that may be used as a bridge power source while a redundant power source comes online in the event of a failure of a primary power source.

In one embodiment, the number of power supplies used to meet the load requirements of a server arrangement may vary depending upon the total amount of power required by the server arrangement. That is, a server arrangement may have more than one associated threshold. For example, a single power supply may provide power to a server when a total power load desired to provide adequate power to the server is at a first level, two power supplies may be powered on to supply power to the server when the total power load desired is at a second level that is above the first level, three power supplies may be powered on to supply power to the server when the total power load desired is at a third level that is above the second level, etc. It should be appreciated that a capacitor arrangement may serve as a bridge power source that provides power during transitions associated with powering on each additional power supply.

A power requirement threshold at which an additional or redundant power supply is transitioned from being substantially offline to being substantially online, and at which a capacitor arrangement provides transitional power, may be determined using any suitable criteria without departing from the spirit or the scope of the present invention. As discussed above, a threshold may be selected, for example, based at least in part upon a point at which a power load efficiency is approximately the same whether a single power supply is used to meet a power load requirement or a plurality of power supplies is used to meet the power load requirement. It should be appreciated, however, that a threshold is not limited to being selected based on a point at which a power load efficiency is approximately the same whether a single power supply is used to meet a power load requirement or a plurality of power supplies is used to meet the power load requirement.

In general, a power requirement threshold may be suitable for use substantially as a limit above which more power supplies are used to meet power load demands and below which fewer power supplies, e.g., one power supply, may be used to meet power load demands. As will be appreciated by those skilled in the art, there may be different power requirement threshold used to determine when to increase a number of power supplies used to meet power load demands and when to decrease a number of power supplies used to meet power load demands. By way of example, when an additional power supply is substantially activated once power load demands are above a first threshold, that additional power supply may, in one embodiment, remain activated until power load demands are below a second threshold that is lower than the first threshold. Hence, a first threshold may be used as a limit above which an additional power supply is activated to meet power load demands and to improve efficiency within a server system, while a second threshold that is different from the first threshold may be used as a limit below which a particular power supply is deactivated to improve efficiency within the server system.

A server system may include any number of servers, power supplies, and/or super capacitors. Further, the amount of power that any particular power supply may supply, in addition to the efficiency associated with any particular power supply, may also vary. While AC-DC power supplies used in servers may exhibit a lower efficiency, e.g., a six to seven percent lower efficiency at a ten percent load than at a twenty percent load, the lower efficiencies associated with lower loads may vary widely. It should be appreciated that the definition of a relatively low efficiency may vary depending, on, but not limited to depending on, the requirements of a particular server deployment.

In addition to bringing additional or redundant power supplies on line substantially only when the power that is demanded by a server system, additional or redundant power supplies may be brought on line to ascertain whether the additional or redundant power supplies are operational. For instance, an additional power supply may be brought on line even when the use of a single power supply to meet power demands is sufficient, in the event that it is desirable to check whether the additional power is likely to be capable of operating when needed.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any suitable physical, computer-readable medium that is capable of storing logic which may be executed, e.g., by a computing system, to perform methods and functions associated with the embodiments. Such computer-readable media may include, but are not limited to including, physical storage and/or memory devices. Executable logic may include hardwired logic components, code devices, computer program code, and/or executable computer commands or instructions. Such executable logic may be executed using a processing arrangement that includes any number of processors.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure.

What is claimed is:

1. A method comprising:
   determining if a power load requirement associated with a server arrangement is below a threshold, wherein the server arrangement includes a plurality of power supplies and a capacitor arrangement, the plurality of power supplies including at least a first power supply and a second power supply;
   providing power to the server arrangement using the first power supply when it is determined that the power load requirement is below the threshold, wherein when it is determined that the power load requirement is below the threshold, the power is not provided to the server arrangement using the second power supply;
   determining if the second power supply is already providing power to the server arrangement when it is determined that the power load requirement is not below the threshold;
   powering on the second power supply if it is determined that the second power supply is not already providing power to the server arrangement; and
   providing the power to the server arrangement using the first power supply and the second power supply when it is determined that the power load requirement is not below the threshold, wherein the capacitor arrangement is configured to provide power to the server arrangement while the second power supply powers on when it is determined that the power load requirement is not below the threshold.

2. The method of claim 1 further including: identifying the power load requirement.

3. The method of claim 2 wherein identifying the power load requirement includes determining a current estimated power load requirement.

4. The method of claim 1 further including:
   determining the threshold, wherein determining the threshold includes identifying a power load at which a first efficiency associated with a power output of the first power supply is approximately equal to a second efficiency, the second efficiency being associated with the power output of the first power supply and a power output of the second power supply.

5. The method of claim 4 wherein the threshold is approximately equal to the power load.

6. The method of claim 1 wherein the threshold is a power load at which a first efficiency associated with operating the first power supply and not operating the second power supply is approximately equal to a second efficiency associated with operating both the first power supply and the second power supply substantially simultaneously.

7. A method comprising:
   determining if a power load requirement associated with a server arrangement is below a threshold, wherein the server arrangement includes a plurality of power supplies and a capacitor arrangement, the plurality of power supplies including at least a first power supply and a second power supply;
   providing power to the server arrangement using the first power supply when it is determined that the power load requirement is below the threshold, wherein when it is determined that the power load requirement is below the threshold, the power is not provided to the server arrangement using the second power supply;
   determining if the second power supply is already providing power to the server arrangement when it is determined that the power load requirement is not below the threshold; powering on the second power supply when it is determined that the power load requirement is not below the threshold and if it is determined that the second power supply is not already providing power to the server arrangement, wherein powering on the second power supply includes providing power to the server arrangement using the capacitor arrangement while the second power supply transitions from not providing power to the server arrangement to providing power to the server arrangement; and
   providing the power to the server arrangement using the first power supply and the second power supply when it is determined that the power load requirement is not below the threshold.

8. The method of claim 7 wherein the capacitor arrangement includes at least one super capacitor.

9. A non-transitory computer-readable medium comprising computer program code, the computer program code, when executed, configured to:
   determine if a power load requirement associated with a server arrangement is below a threshold, wherein the server arrangement includes a plurality of power supplies and a capacitor arrangement, the plurality of power supplies including at least a first power supply and a second power supply;
   provide power to the server arrangement using the first power supply when it is determined that the power load requirement is below the threshold, wherein when it is determined that the power load requirement is below the threshold, the power is not provided to the server arrangement using the second power supply;
   determine if the second power supply is already providing power to the server arrangement when it is determined that the power load requirement is not below the threshold;
   power on the second power supply if it is determined that the second power supply is not already providing power to the server arrangement; and
   provide the power to the server arrangement using the first power supply and the second power supply when it is determined that the power load requirement is not below the threshold, wherein the capacitor arrangement is configured to provide power to the server arrangement while the second power supply powers on when it is determined that the power load requirement is not below the threshold.

10. The computer-readable medium of claim 9 wherein the computer program code is further configured to:
    identify the power load requirement, wherein the computer program code configured to identify the power load requirement is further configured to determine a current estimated power load requirement.

11. The computer-readable medium of claim 9 wherein the computer program code is further configured to:
    determine the threshold, wherein the computer program code configured to determine the threshold is further configured to identify a power load at which a first efficiency associated with a power output of the first power supply is approximately equal to a second efficiency, the second efficiency being associated with the power output of the first power supply and a power output of the second power supply.

12. The computer-readable medium of claim 11 wherein the threshold is approximately equal to the power load.

13. The computer-readable medium of claim 9 wherein the threshold is a power load at which a first efficiency associated with operating the first power supply and not operating the second power supply is approximately equal to a second efficiency associated with operating both the first power supply and the second power supply substantially simultaneously.

14. The computer-readable medium of claim 9 wherein the computer program code configured to power on the second power supply is further configured to provide power to the server arrangement using the capacitor arrangement while the second power supply transitions from not providing power to the server arrangement to providing power to the server arrangement.

15. The computer-readable medium of claim 14 wherein the capacitor arrangement includes at least one super capacitor.

16. An apparatus comprising:
    at least a first server;
    a plurality of power supplies, the plurality of power supplies including at least a first power supply and a second power supply, the plurality of power supplies being arranged to provide power to the at least first server;
    a capacitor arrangement, the capacitor arrangement including at least one super capacitor, the capacitor arrangement being coupled to at least the second power supply, wherein the capacitor arrangement is configured to provide power to the at least first server while the second power supply powers on; and
    a logic module, the logic module being arranged to determine a power load requirement associated with the first server, the logic module further being arranged to determine when to power the at least first server using the first power supply and when to power the at least first server using both the first power supply and the second power supply, the logic module still further being arranged to determine when the power load requirement is below the threshold and to determine when the second power supply is already providing power to the at least first server, wherein when it is determined that the second power supply is not already providing power to the at least first server, the logic module further causes the second power supply to be powered on.

17. The apparatus of claim 16 wherein the logic module is arranged to cause the first power supply to power the at least first server when it is determined that the power load requirement is below the threshold, the logic module further being arranged to cause both the first power supply and the second power supply to power the at least first server when it is determined that the power load requirement is not below the threshold.

18. The apparatus of claim 17 wherein the logic module is still further arranged to determine the threshold, the threshold being a power load at which a first efficiency associated with operating the first power supply is approximately equal to a second efficiency associated with operating both the first power supply and the second power supply substantially simultaneously.

19. The apparatus of claim 16 wherein the logic module determines that the at least first server is to be powered using both the first power supply and the second power supply.

20. The apparatus of claim 17 wherein when it is determined that the second power supply is not already providing power to the at least first server, the logic module causes the capacitor arrangement to provide power to the at least first server at least until the second power supply is powered on.

* * * * *